(12) United States Patent
Juikar et al.

(10) Patent No.: US 7,718,733 B2
(45) Date of Patent: May 18, 2010

(54) OPTICALLY CLEAR POLYCARBONATE POLYESTER COMPOSITIONS

(75) Inventors: Vishvajit Chandrakant Juikar, Bangalore (IN); Ganesh Kannan, Evansville, IN (US); Bernardus Antonius Gerardus Schrauwen, Eindhoven (NL); Gabrie J. M. Hoogland, Breda (NL)

(73) Assignee: Sabic Innovative Plastics IP B.V. (NL)

( * ) Notice: Subject to any disclaimer, the term of this patent is extended or adjusted under 35 U.S.C. 154(b) by 416 days.

(21) Appl. No.: 11/017,555

(22) Filed: Dec. 20, 2004

(65) Prior Publication Data
US 2006/0135690 A1  Jun. 22, 2006

(51) Int. Cl.
*C08L 69/00* (2006.01)
*C08L 67/02* (2006.01)

(52) U.S. Cl. ............... 525/67; 525/92 E; 525/101; 525/439; 525/464

(58) Field of Classification Search ............ None
See application file for complete search history.

(56) References Cited

U.S. PATENT DOCUMENTS

| | | | |
|---|---|---|---|
| 2,465,319 A | 3/1949 | Whinfield et al. | |
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,153,008 A | 10/1964 | Fox | |
| 3,169,121 A | 2/1965 | Goldberg et al. | |
| 3,189,662 A | 6/1965 | Vaughn, Jr. | |
| 3,271,367 A | 9/1966 | Schnell et al. | |
| 3,271,368 A | 9/1966 | Goldberg et al. | |
| 3,419,635 A | 12/1968 | Vaughn, Jr. | |
| 3,832,419 A | 8/1974 | Merritt, Jr. | |
| 4,125,572 A | 11/1978 | Scott | |
| 4,155,898 A | 5/1979 | Bopp | |
| 4,161,469 A | 7/1979 | LeGrand | |
| 4,161,498 A | 7/1979 | Bopp | |
| 4,188,314 A | 2/1980 | Fox | |
| 4,217,438 A | 8/1980 | Brunelle | |
| 4,391,954 A | 7/1983 | Scott | |
| 4,487,896 A | 12/1984 | Mark | |
| 4,681,922 A | 7/1987 | Schmidt | |
| 4,786,692 A | 11/1988 | Allen | |
| 4,794,141 A | 12/1988 | Paul | |
| 4,897,453 A | 1/1990 | Flora | |
| 4,994,532 A | 2/1991 | Hawkins | |
| 5,026,791 A | 6/1991 | Hawkins | |
| 5,367,011 A | 11/1994 | Walsh | |
| 5,411,999 A | 5/1995 | Gallucci | |
| 5,478,896 A | 12/1995 | Scott | |
| 5,510,414 A * | 4/1996 | Okamoto et al. | 524/494 |
| 5,530,083 A * | 6/1996 | Phelps et al. | 528/25 |
| 5,981,661 A * | 11/1999 | Liao et al. | 525/165 |
| 6,281,299 B1 | 8/2001 | Saito | |
| 2002/0111428 A1* | 8/2002 | Gaggar et al. | 525/67 |

FOREIGN PATENT DOCUMENTS

| | | | |
|---|---|---|---|
| EP | 188791 | * | 7/1986 |
| EP | 0224805 | | 6/1987 |
| EP | 0269324 | | 6/1988 |
| EP | 0347599 | | 12/1989 |
| EP | 524731 | * | 1/1993 |
| EP | 0709432 | | 5/1996 |

OTHER PUBLICATIONS

Okamoto, Relationship between the Composition of Polycarbonate Copolymers and the Refractive Index; Journal of Applied Polymer Science vol. 84, p. 514-521; 2002.*

U.S. Appl. No. 10/882,529, filed Jun. 30, 2004, Thermoplastic Compositions.

U.S. Appl. No. 10/373,547, filed Feb. 24, 2003, Transparent Polycarbonate Polyester Composition and Process.

* cited by examiner

*Primary Examiner*—David Buttner
(74) *Attorney, Agent, or Firm*—Cantor Colburn LLP

(57) ABSTRACT

An optically clear thermoplastic resin composition consisting essentially of: structural units derived at least one substituted or unsubstituted polycarbonate, at least greater than 30 weight percent of a substituted or unsubstituted polyester, a modified polycarbonate, an impact modifier having a refractive index in the range between about 1.51 and about 1.56 and an additive is disclosed. The composition possess good optical properties, flow, stability and mechanical property. Also disclosed is a process to prepare these compositions and articles therefrom.

29 Claims, No Drawings

OPTICALLY CLEAR POLYCARBONATE POLYESTER COMPOSITIONS

BACKGROUND OF THE INVENTION

This invention relates to an optically clear thermoplastic resin composition, a method to synthesize the composition and articles made from the compositions.

Polycarbonate is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation, and poor processability. Blends of polyesters with polycarbonates provide thermoplastic compositions having improved properties over those based upon either of the single resins alone. Moreover, such blends are often more cost effective than polycarbonate alone. The miscibility of PC with the polyesters gives the blends the clarity needed, but this is restricted to (semi) aliphatic polyesters such as poly (cyclohexane dimethanol cyclohexane dicarboxylate) (PCCD) or a glycolized copolyester such as polyethylene glycol cyclohexane dimethanol terephthalate (PCTG).

U.S. Pat. Nos. 4,188,314; 4,125,572; 4,391,954; 4,786,692; 4,897,453, and 5,478,896 relate to blends of an aromatic polycarbonate and poly cyclohexane dimethanol phthalate. U.S. Pat. No. 4,125,572 relates to a blend of polycarbonate, polybutylene terephthalate (PBT) and an aliphatic/cycloaliphatic iso/terephthalate resin. U.S. Pat. No. 6,281,299 discloses a process for manufacturing transparent polyester/polycarbonate compositions, wherein the polyester is fed into the reactor after bisphenol A is polymerized to a polycarbonate. WO2004076541 describes thermoplastic composition based of a polycarbonate polymer with embedded polysiloxane domains having an average domain size between 20 and 45 nanometers or between 20 and 40 nanometers, which are translucent in nature.

Condensation copolymers having polysiloxane and polycarbonate blocks are known. Representative of such polymers are those disclosed by U.S. Pat. Nos. 4,681,922, 3,189,662, 3,419,635, and 3,832,419 have an elastomeric character and useful as adhesives, coatings, sealants, roofing material, impact modifying additives and the like. While U.S. Pat. No. 4,794,141 discloses molding compositions containing polydiorganosiloxane/polycarbonate block copolymers, elastomeric polymers. The elastomeric polymer is described as a hydrogenated block copolymer of a vinyl aromatic monomer and a conjugated diene.

A polymer blend comprising a polyalkylene terephthalate, an organopolysiloxane-polycarbonate block copolymer, and a halogenated copolycarbonate having improved impact, heat distortion and flame retardant properties is described in U.S. Pat. No. 4,155,898. U.S. Pat. Nos. 4,161,498; 4,155,898; and 4,161,469 describe polyalkylene terephthalate resin and all organopolysiloxane-poly-carbonate block copolymer having impact and heat distortion properties. U.S. Pat. No. 4,994,532 describes functionalized polydimethylsiloxane fluids which react with polycarbonate in the melt to form polydimethylsiloxane/polycarbonate block copolymers. The resultant copolymers are described as transparent and show improved flow. The U.S. Pat. No. 5,026,791 relates to an aromatic carbonate polymer having a siloxane Unit in the backbone of the polymer. U.S. patent application Ser. No. 10/882,529 disclose a transparent/translucent composition comprising 1 to 30 weight percent of a cycloaliphatic polyester and greater than or equal to 40 weight percent of a polyorganosiloxane/polycarbonate block copolymer, while U.S. patent application Ser. No. 10/373,547 teaches the compositions with polyesters with impact modifiers. However in the above compositions low temperature ductility is sacrificed for better flow and impact, and use of impact modifiers leads to a decrease in the transparency. The polymers of polycarbonate with the siloxane, while useful, have lower than desired flow properties, require high torque or high molding pressures during processing. The siloxane-carbonate polymers are also known to possess inadequate impact strength at low temperatures and inadequate resistance to distortion.

From the standpoint of ease of processing, it is desirable for a thermoplastic to have higher melt flow properties. There is a continuing need for polycarbonate polyester blends having a good balance of optical property, processability, solvent resistance and good mechanical and thermal properties.

BRIEF DESCRIPTION OF THE INVENTION

One embodiment of the present invention is an optically clear thermoplastic resin composition consisting essentially of: structural units derived at least one substituted or unsubstituted polycarbonate, at least greater than 30 weight percent of a substituted or unsubstituted polyester, a modified polycarbonate, an impact modifier having a refractive index in the range between about 1.51 and about 1.56 and an additive. The composition disclosed possesses good optical properties, flow and mechanical property. Also disclosed is a process to make the optically clear thermoplastic resin compositions of the present invention and articles derived from said composition.

Various other features, aspects, and advantages of the present invention will become more apparent with reference to the following description, examples, and appended claims.

DETAILED DESCRIPTION OF THE INVENTION

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester.

As used herein the term "PCCD" is defined as poly(cyclohexane-1,4-dimethylene cyclohexane-1,4-dicarboxylate).

As used herein the term "BPA" refers to bisphenol A.

As used herein the term "aliphatic radical" refers to a radical having a valence of at least one comprising a linear or branched array of atoms which is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —CH$_2$CHBrCH$_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —CONH$_2$), carbonyl, dicyanoisopropylidene (i.e. —CH$_2$C(CN)$_2$CH$_2$—), methyl (i.e. —CH$_3$), methylene (i.e. —CH$_2$—), ethyl, ethylene, formyl, hexyl, hexamethylene, hydroxymethyl (i.e. —CH$_2$OH), mercaptomethyl (i.e. —CH$_2$SH), methylthio (i.e. —SCH$_3$), metlhylthiomethyl (i.e. —CH$_2$SCH$_3$), methoxy, methoxycarbonyl, nitromethyl (i.e. —CH$_2$NO$_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to I or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —(CH$_2$)$_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —OPhC(CF$_3$)$_2$PhO—), chloromethylphenyl; 3-trifluorovinyl-2-thienyl; 3-trichloromethylphenyl (i.e. 3-CCl$_3$Ph-), bromopropylphenyl (i.e. BrCH$_2$CH$_2$CH$_2$Ph-), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. H$_2$NPh-), aminocarbonylphenyl (i.e. NH$_2$COPh-Ph-), 4-benzoylphenyl, dicyanoisopropylidenebis(4-phenyloxy) (i.e. —OPhC(CN)$_2$PhO—), 3-methylphenyl, methylenebis(4-phenyloxy) (i.e. —OPhCH$_2$PhO—), ethylphenyl, phenylethenyl, 3-formyl-2-thienyl, 2-hexyl-5-furanyl; hexamethylene-1,6-bis(4-phenyloxy) (i.e. —OPh(CH$_2$)$_6$PhO—); 4-hydroxymethylphenyl (i.e. 4-HOCH$_2$Ph-Ph-), 4-mercaptomethylphenyl (i.e. 4-HSCH$_2$Ph-), 4-methylthiophenyl (i.e. 4-CH$_3$SPh-), methoxyphenyl, methoxycarbonylphenyloxy (e.g. methyl salicyl), nitromethylphenyl (i.e. -PhCH$_2$NO$_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethy group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —OC$_6H_{11}$C(CF$_3$)$_2$C$_6H_{11}$O—), chloromethylcyclohexyl; 3-trifluorovinyl-2-cyclopropyl; 3-trichloromethylcyclohexyl (i.e. 3-CCl$_3$C$_6H_{11}$—), bromopropylcyclohexyl (i.e. BrCH$_2$CH$_2$CH$_2$C$_6H_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. H$_2$N C$_6H_{11}$—), aminocarbonylcyclopenyl (i.e. NH$_2$COC$_5H_9$—), 4-acetyloxycyclohexyl, dicyanoisopropylidenebis(4-cyclohexyloxy) (i.e. —OC$_6H_{11}$C(CN)$_2$C$_6H_{11}$O—), 3-methylcyclohexyl, methylenebis(4-cyclohexyloxy) (i.e. —OC$_6H_{11}$CH$_2$C$_6H_{11}$O—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —OC$_6H_{11}$(CH$_2$)$_6$C$_6H_{11}$O—); 4-hydroxymethylcyclohexyl (i.e. 4-HOCH$_2$C$_6H_{11}$—), 4-mercaptomethylcyclohexyl (i.e. 4-HSCH$_2$C$_6H_{11}$—), 4-methylthiocyclohexyl (i.e. 4-CH$_3$SC$_6H_{11}$—), 4-methoxycyclohexyl, 2-methoxycarbonylcyclohexyloxy (2-CH$_3$OCO C$_6H_{11}$O—), nitromethylcyclohexyl (i.e. NO$_2$CH$_2$C$_6H_{10}$—), trimetlhylsilylcyclohexyl, t-butyldimethylsilylcyclopentyl, 4-trimethoxysilyethylcyclohexyl (e.g. (CH$_3$O)$_3$SiCH$_2$CH$_2$C$_6H_{10}$—), vinylcyclohexenyl, vinylidenebis(cyclolhexyl), and the like. The term "a $C_3$-$C_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

A component of the composition of the invention is an aromatic polycarbonate. The aromatic polycarbonate resins suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411,999, the respective disclosures of which are each incorporated herein by reference.

Polycarbonates useful in the invention comprise repeating units of the formula (I)

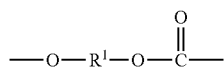
(I)

wherein $R^1$ is a divalent aromatic radical derived from a dihydroxyaromatic compound of the formula HO-D-OH, wherein D has the structure of formula:

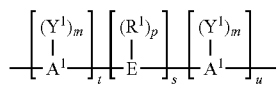
(II)

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butyliclele, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcycloheptylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro-or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In dihydroxy-substituted aromatic hydrocarbons in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o-or m-phenylene or one o-or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include those of the formula (III):

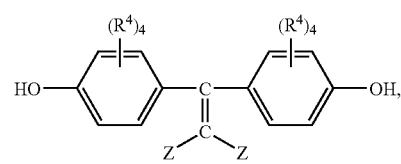
(III)

where independently each $R^4$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (IV):

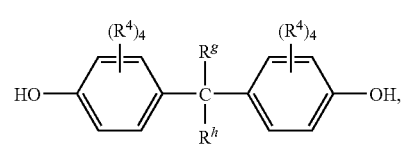
(IV)

where independently each R4 is as defined hereinbefore, and independently Rg and Rh are hydrogen or a C1-30 hydrocarbon group.

In some embodiments of the present invention, dihydroxy-substituted aromatic hydrocarbons that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, dihydroxy-substituted aromatic hydrocarbons comprise bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis (4-hydroxyphenyl)methane; bis(4-hydroxy-5-nitrophenyl) methane; bis(4-hydroxy-2,6-dimethyl-3-methoxyphenyl) methane; 1,1-bis(4-hydroxyphenyl)ethane; 1,2-bis(4-hydroxyphenyl)ethane; 1,1-bis(4-hydroxy-2-chlorophenyl) ethane; 2,2-bis(3-phenyl-4-hydroxyphenyl)propane; 2,2-bis (4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; C1-3 alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl) cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide, bis(3,5-dimethyl-4-hydroxyphenyl)sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

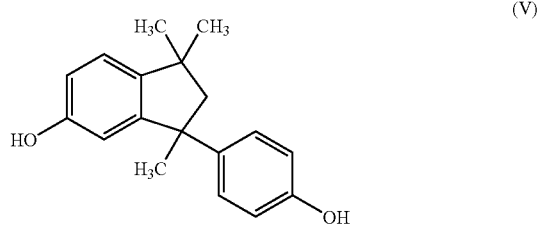

(V)

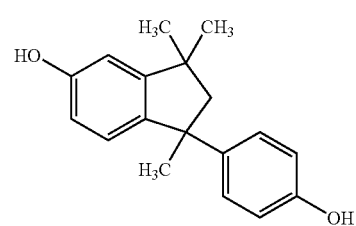

(VI)

Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols having formula (VII):

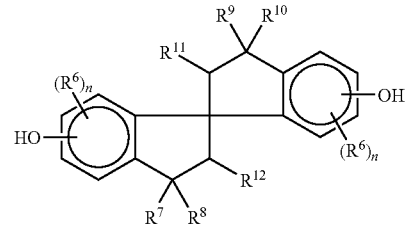

(VII)

wherein each $R^6$ is independently selected from monovalent hydrocarbon radicals and halogen radicals; each $R^7$, $R^8$, $R^9$, and $R^{10}$ is independently C1-6 alkyl; each $R^{11}$ and $R^{12}$ is independently H or C1-6 alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI"). Mixtures of alkali metal salts derived from mixtures of any of the foregoing dihydroxy-substituted aromatic hydrocarbons may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples Cl-C32 alkyl optionally substituted with one or more groups selected from C1-C32 alkyl, C3-C15 cycloalkyl or aryl; and C3-C15 cycloalkyl optionally Substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6-C15 aryl optionally substituted with one or more groups selected from C1-C32 alkyl, C3-C15 cycloalkyl or aryl. Some particular illustrative examples of aryl radicals comprise substituted or unsubstituted phenyl, biphenyl, toluyl and naphthyl.

Mixtures comprising two or more hydroxy-substituted hydrocarbons may also be employed. In some particular embodiments mixtures of at least two monohydroxy-substituted alkyl hydrocarbons, or mixtures of at least one monohydroxy-substituted alkyl hydrocarbon and at least one dihydroxy-substituted alkyl hydrocarbon, or mixtures of at least two dihydroxy-substituted alkyl hydrocarbons, or mixtures of at least two monohydroxy-substituted aromatic hydrocarbons, or mixtures of at least two dihydroxy-substituted aromatic hydrocarbons, or mixtures of at least one monohydroxy-substituted aromatic hydrocarbon and at least one dihydroxy-substituted aromatic hydrocarbon, or mixtures of at least one monohydroxy-substituted alkyl hydrocarbon and at least one dihydroxy-substituted aromatic hydrocarbon may be employed.

In yet another, the polycarbonate resin is a linear polycarbonate resin that is derived from bisphenol A and phosgene. In an alternative embodiment, the polycarbonate resin is a blend of two or more polycarbonate resins.

The aromatic polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available. In one embodiment, the aromatic polycarbonate resins are commercially available from General Electric Company, e.g., LEXAN™ bisphenol A-type polycarbonate resins.

The preferred polycarbonates are preferably high molecular weight aromatic carbonate polymers have an intrinsic viscosity (as measured in methylene chloride at 25° C.) ranging from about 0.30 to about 1.00 deciliters per gram. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In one embodiment the optically clear thermoplastic composition comprises polyesters. Methods for making polyester resins and the use of polyester resins in thermoplastic molding compositions are known in the art. Conventional polycondensation procedures are described in the following, see, generally, U.S. Pat. Nos. 2,465,319, 5,367,011 and 5,411,999, the respective disclosures of which are each incorporated herein by reference.

Typically polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (VIII)

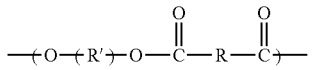

(VIII)

wherein, R' is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic dicarboxylic acid. In one embodiment of the present invention the polyester could be an aliphatic polyester where at least one of R' or R is a cycloalkyl containing radical. The polyester is a condensation product where R' is the residue of an aryl, alkane or cycloalkane containing diol having 6 to 20 carbon atoms or chemical equivalent thereof, and R is the decarboxylated residue derived from an aryl, aliphatic or cycloalkane containing diacid of 6 to 20 carbon atoms or chemical equivalent thereof. The polyester resins are typically obtained through the condensation or ester interchange polymerization of the diol or diol equivalent component with the diacid or diacid chemical equivalent component.

R' and R are preferably cycloalkyl radicals independently selected from the following structure IX:

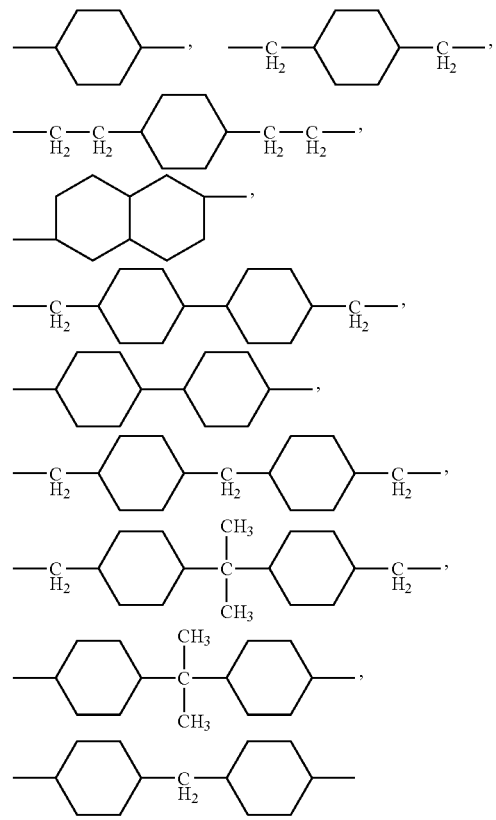

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters, and the like. Typically the polyester resin may comprise one or more resins selected from linear polyester resins, branched polyester resins and copolymeric polyester resins.

A preferred cycloaliphatic polyester is poly (cyclohexane-1,4-dimethylene cyclohexane-1,4-dicarboxylate) also referred to as poly (1,4-cyclohexane-dimethanol 1,4-dicarboxylate) (PCCD) which has recurring units of formula X:

The starting DMCD typically has a trans-cis ratio greater than about 6 to 1, preferably greater than 9 to 1, and even more preferably greater than 19 to 1. In the resulting PCCD, it is preferable that less than about 10 percent the starting trans DMCD, and more preferable that less than about 5 percent of the starting trans DMCD be converted to the cis isomer during the reaction of CHDM and DMCD to produce PCCD. The trans:cis ratio of the CHDM is preferable greater than 1 to 1, and more preferably greater than about 2 to 1.

The resulting linear PCCD polymer is characterized by the absence of branching. During the reaction process, branching may be induced by the addition of polyglycol and such branching agents as trimellitic acid or anhydride, trimesic acid, trimethylolethane, trimethylolpropane, or a trimer acid. The use of such branching agents is not desirable according to the present invention.

Preferably the amount of catalyst present is less than about 200 ppm. Typically, catalyst may be present in a range from about 20 to about 300 ppm. The most preferred materials are blends where the polyester has both cycloaliphatic diacid and cycloaliphatic diol components specifically polycyclohexane dimethanol cyclohexyl dicarboxylate (PCCD).

In one embodiment the above polyesters with from about 1 to about 50% by weight, of units derived from polymeric aliphatic acids and/or polymeric aliphatic polyols to form copolyesters. The aliphatic polyols include glycols, such as poly(ethylene glycol) or poly(butylene glycol). In another embodiment suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PCTG") copolymers. In a preferred embodiment suitable copolymeric

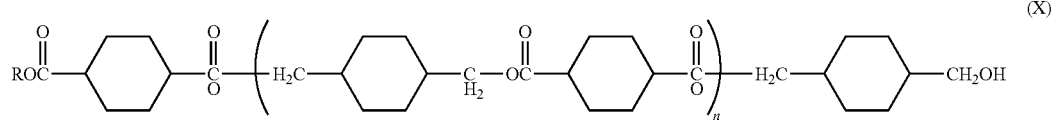

(X)

With reference to the previously set forth general formula, for PCCD, $R_3$ is derived from 1,4 cyclohexane dimethanol; and $R_4$ is a cyclohexane ring derived from cyclohexanedicarboxylate or a chemical equivalent thereof. The favored PCCD has a cis/trans formula. In one embodiment R is an alkyl from 1 to 6 carbon atoms or residual end groups derived from either monomer, and n is greater than about 70. The polyester is derived from the transesterification reaction of a starting DMCD and a starting CHDM. The trans-cis ratio of repeating units derived from DMCD is preferably greater than about 8 to 1, and the trans-cis ratio of repeating units derived from CHDM is preferable greater than about 1 to 1. The polyester resin typically a viscosity of about 2500 poise and a melting temperature greater than 216 C. degrees Centigrade, and an acid number less than about 10, preferably less than about 6 meq/kg.

The linear PCCD polyester is prepared by the condensation reaction of CHDM and DMCD in the presence of a catalyst wherein the starting DMCD has a trans-cis ratio greater than the equilibrium trans-cis ratio. The resulting prepared PCCD polyester has a trans-cis ratio of repeating polymer units derived from the respective starting DMCD which has a trans-cis ratio substantially equal to the respective starting trans-cis ratio for enhancing the crystallinity of the resulting PCCD.

polyester resins include, e.g., cyclohexanedimethanol-terephthalic acid-isophthalic acid copolymers and cyclohexanedimethanol-terephthalic acid-ethylene glycol ("PCTG") copolymers. The polyester component can, without limitation, comprise the reaction product of a glycol portion comprising 1,4-cyclohexanedimethanol and ethylene glycol, wherein the 1,4-cyclohexanedimethanol is greater than 50 mole percent based on the total moles of 1,4-cyclohexanedimethanol and ethylene glycol with an acid portion comprising terephthalic acid, or isophthalic acid or mixtures of both acids.

In one embodiment copolyester in the subject invention is a copolyester as described above wherein the cyclohexanedimethanol portion has a predominance over ethylene glycol, preferably is about greater than 55 molar percent of cyclohexanedimethanol based on the total mole percent of ethylene glycol and 1,4-cyclohexanedimethanol, and the acid portion is terephthalic acid. In another embodiment of the present invention the polyester comprises structural units derived from terephthalic acid and a mixture of 1,4-cyclohexane dimethanol and ethylene glycol, wherein said cyclohexanedimethanol is greater than about 60 mole percent based on total moles of 1,4-cyclohexane dimethanol and ethylene glycol.

The preferred polyesters are preferably low molecular weight polyester polymers have an intrinsic viscosity (as measured in methlylene chloride at 25° C.) ranging from about 0.1 to about 1.5 deciliters per grail. Polyesters branched or unbranched and generally will have a weight average molecular weight of from about 5,000 to about 100,000, preferably from about 8,000 to about 50,000 as measured by viscosity measurements in Phenol/tetrachloroethane (60:40, volume/volume ratio) solvent mixture. It is contemplated that the polyesters have various known end groups.

The polyester component may be prepared by procedures well known to those skilled in this art, such as by condensation reactions. The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)_6$ in n-butanol.

The thermoplastic composition comprises a modified polycarbonate. In one embodiment the modified polycarbonate is a siloxane modified polycarbonate. The organopolysiloxane may be a linear, cyclic, net form or partially branched linear organopolysiloxane having an organoxysilyl group which is bonded to a silicon atom through a divalent hydrocarbon group. Examples of the organopolysiloxane having an organoxysilyl group bonded to a silicon atom through a divalent hydrocarbon group are the linear organopolysiloxanes expressed by the general formula (XI):

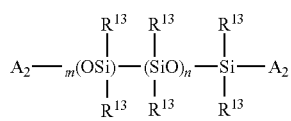

(XI)

wherein $R^{13}$ is a monovalent hydrocarbon group, $A_2$ is a monovalent hydrocarbon group or a monovalent hydrocarbon group having an organoxysilyl group expressed by the general formula (XII):

$$—R^{14}SiR^{15}_x(OR^{16})_{(3-x)}$$ (XII)

$R^{14}$ is a divalent hydrocarbon group, $R^{15}$ and $R^{16}$ are, respectively, a monovalent hydrocarbon group and x is an integer of 0 to 2), at least one of $A_2$ is a monovalent hydrocarbon group comprising the organoxysilyl group, m is an integer of 1 to 300, n is an integer of 0 to 300 and m+n is an integer of 1 to 300.

Examples of the monovalent hydrocarbon group shown by $R^{13}$ in the general formula (XI) include but are not limited to alkyl groups, such as methyl group, ethyl group, propyl group, butyl group, pentyl group, hexyl group and the like; alkenyl groups, such as vinyl group, allyl group, butenyl group, pentenyl group, hexenyl group and the like; aryl groups, such as phenyl group, tolyl group, xylyl group and the like; aralkyl groups, such as benzyl group, phenetyl group and the like; and substituted alkyl groups, such as chloromethyl group, chloropropyl group, 3,3,3-trifluoropropyl group and the like. Examples of the monovalent hydrocarbon shown by $A_2$ are the same as those described above.

Non-limiting examples of the divalent hydrocarbon group shown by $R^{14}$ in the general formula (XII) are alkylene groups, such as methylmethylene group, ethylene group, methylethylene group, propylene group, butylene group and the like. Examples of the monovalent hydrocarbon group comprising all organoxysilyl group are trimethoxysilylethylene group, triethoxysilylethylene group, dimethoxyphenoxysilylpropylene group, trimethoxysilylpropylene group, trimethoxysilylbutylene group, methyldimethoxysilylpropylene group, dimethylmethoxysilylpropylene group and the like.

In one embodiment the modified polycarbonate is a polysiloxane-polycarbonate copolymers. In another embodiment the modified polycarbonate comprises a polysiloxane from recurring polysiloxane blocks of the formula XIII:

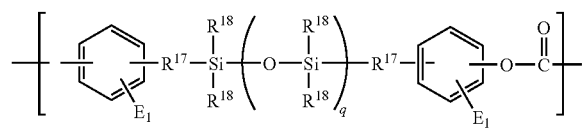

The polycarbonate-block comprises units of the formula XIV or in one embodiment the polycarbonate is as described earlier:

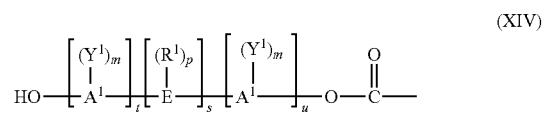

(XIV)

with the preferred polycarbonate-block comprises units of the formula (XV):

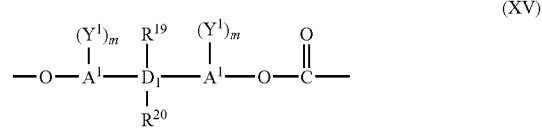

(XV)

wherein $R^{15}$, $R^{17}$, $R^{18}$, $R^{19}$, $R^{20}$ is selected from the group consisting of aliphatic, aromatic and cycloaliphatic groups. $A^1$ is a divalent hydrocarbon radical containing from 1-15 carbon atoms; —S—, —SO—, —S(O)$_2$; —O—. Preferably $D_1$ is a divalent hydrocarbon radial. In the case where $A^1$ is —C($R^{30}$)$_2$—, $R^{30}$ is a member selected from the class of hydrogen, cycloaliphatic, aryl, monovalent hydrocarbon radicals, aryl or alkyaryl, preferably $R^{30}$ is alkyl, preferably C1-C6 alkyl, and more preferably methyl.

The resulting organopolysiloxane-polycarbonate block copolymer includes organopolysiloxane-polycarbonate blocks having repeating units of the general formula (XVI):

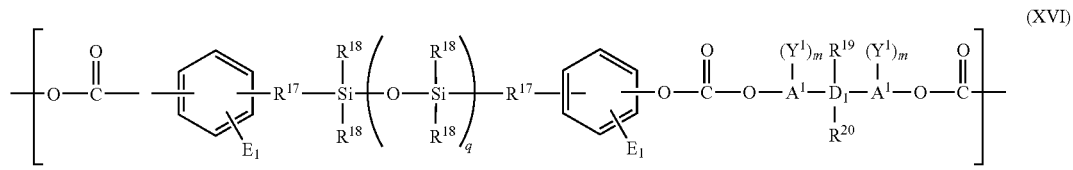

(XVI)

In the above formulae, $R^{17}$ and $R^{18}$ are aliphatic, aromatic or cycloaliphatic radicals; $E_1$ is a member independently selected from the class of hydrogen, lower alkyl, alkoxy radicals, aryl, and alkylaryl, halogen radicals and mixtures thereof, preferably hydrogen or alkoxy and when alkoxy, preferably methoxy; $R^{17}$ is a divalent hydrocarbon radical, preferably an alkylene radical of from 1 to 6 carbon atoms with $C_3$ being most preferred, and q is from about 10 to about 120, preferably from about 40 to about 60.

In one embodiment the modified polycarbonate is a polyorganosiloxane/polycarbonate block copolymer, wherein said copolymer comprises polyorganosiloxane domains having an average domain size less than or equal to 45 nanometers. Preferred polysiloxane-polycarbonate copolymers comprise polysiloxane blocks of the following general formulae XVII:

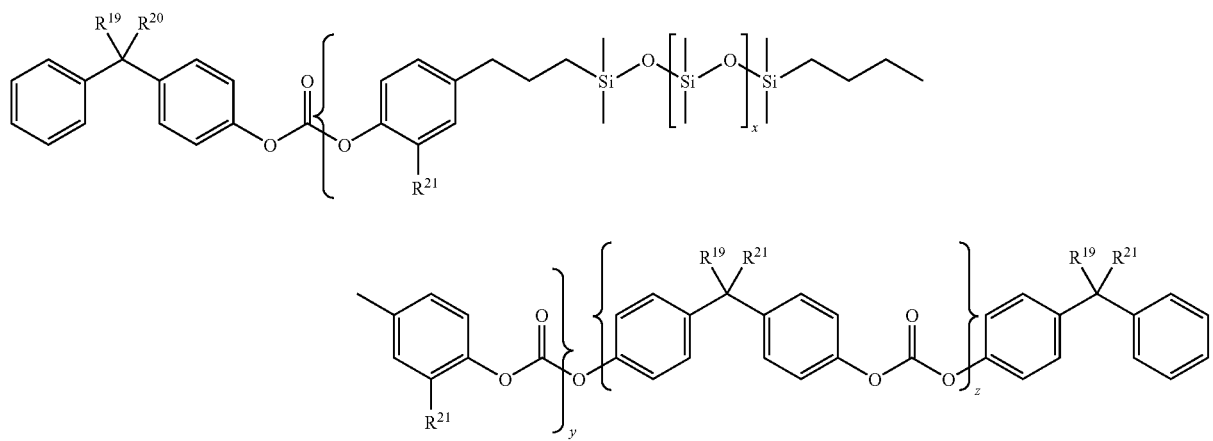

wherein $R^{21}$ is an alkyl, aryl, alkoxy, aryloxy group and where Y and Z are integers between about 1 to 1000.

In one embodiment the organopolysiloxane-polycarbonate block copolymer of is of the structure XVIII

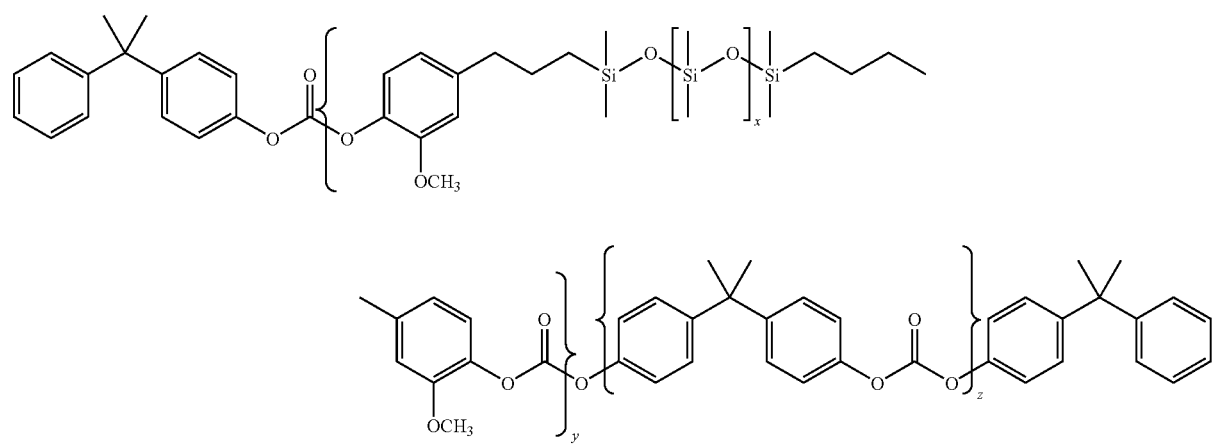

Included within the radicals represented by $R^{19}$ and $R^{20}$ aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, cycloalkyl, haloalkyl including methyl, ethyl propyl, chlorobutyl, cyclohexyl, etc.; $R^{19}$ and $R^{20}$ can be all the same radical or any two or more of the aforementioned radicals, while $R^{19}$ and $R^{20}$ is preferably methyl, $R^{17}$ includes all radicals included by $R^{19}$ and $R^{20}$ above except hydrogen, where $R^{17}$ also can be all the same radical or any two or more of the aforementioned $R^{19}$ and $R^{20}$ radicals except hydrogen and $R^{17}$ is preferably methyl. $R^{17}$ also includes, in addition to all the radicals included by $R^{19}$ and $R^{20}$, except hydrogen, cyanoalkyl radicals such as cyanoethyl, cyanobutyl, etc. radicals. Radicals that are included within the definition of $E_1$ are hydrogen, methyl, ethyl, propyl, chloro, bromo, etc. and combinations thereof, and $E_1$ is preferably hydrogen. The polyorganosiloxane/polycarbonate block copolymer comprises a polyorganosiloxane blocks comprising, on average, greater than or equal to ten siloxane units and about 0.5 to about 80 weight percent polydimethylsiloxane based on the total weight of the block copolymer. In one embodiment the modified polycarbonate is a polyorganosiloxane/bisphenol-A polycarbonate.

In one embodiment the thermoplastic composition comprises an impact modifier. The impact modifier may comprise in one embodiment one of several different rubbery modifiers such as graft or core shell rubbers or combinations of two or more of these modifiers. For example, the impact modifiers may comprise acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer or glycidyl ester impact modifier.

The term acrylic rubber modifier may refer to multi-stage, core-shell, interpolymer modifiers having a cross-linked or partially crosslinked (meth)acrylate rubbery core phase, for example, butyl acrylate. Associated with this cross-linked acrylic ester core is an outer shell of an acrylic or styrenic resin, generally methyl methacrylate or styrene, which interpenetrates the rubbery core phase. Incorporation of small amounts of other monomers such as acrylonitrile or (meth) acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Suitable impact modifiers are graft or core shell structures with a rubbery component with a Tg below 0° C., more specifically between –40° to –80° C., composed of poly alkylacrylates or polyolefins grafted with polymethylmethacrylate (PMMA) or styrene acrylonitrile (SAN). Specifically the rubber content is at least 10 weight percent, more specifically greater than 30 weight percent, and most specifically between 40 and 75 weight percent. In one embodiment suitable rubbers are the butadiene core-shell polymers of the type. In another embodiment, the impact modifier will comprise a two stage polymer having an butadiene based rubbery core and a second stage polymerized from methylmethacrylate alone or in combination with styrene. Other suitable rubbers are the ABS types Bliendex® 336 and 415, available form GE Specialty Chemicals, Paraloid® EXL2600 from Rohm & Haas. The above were non limiting examples of rubbers that could be suitable as impact modifiers. In one embodiment any rubber having a refractive index (RI) between about 1.51 and about 1.56 are suitable for the present invention. Although several rubbers have been described, many more are commercially available. Any rubber may be used as an impact modifier as long as the impact modifier does not negatively impact the physical or aesthetic properties of the thermoplastic composition.

In one embodiment the claimed invention a catalyst may optionally be employed. If used, the catalyst can be any of the catalysts commonly used in the prior art such as alkaline earth metal oxides such as magnesium oxides, calcium oxide, barium oxide and zinc oxide; alkali and alkaline earth metal salts; a Lewis catalyst such as tin or tinanium compounds; a nitrogen-containing compound such as tetra-alkyl ammonium hydroxides used like the phosphonium analogues, e.g., tetra-alkyl phosphonium hydroxides or acetates. The Lewis acid catalysts and the catalysts can be used simultaneously.

Inorganic compounds such as the hydroxides, hydrides, amides, carbonates, phosphates, borates, etc., of alkali metals such as sodium, potassium, lithium, cesium, etc., and of alkali earth metals such as calcium, magnesium, barium, etc., can be cited such as examples of alkali or alkaline earth metal compounds. Examples include sodium stearate, sodium carbonate, sodium acetate, sodium bicarbonate, sodium benzoate, sodium caproate, or potassium oleate.

In one embodiment of the invention, the catalyst is selected from one of phosphonium salts or ammonium salts (not being based on any metal ion) for improved hydrolytic stability properties. In another embodiment of the invention, the catalyst is selected from one of: a sodium stearate, a sodium benzoate, a sodium acetate, and a tetrabutyl phosphonium acetate. In yet another embodiment of the present invention the catalysts is selected independently from a group of sodium stearate, zinc stearate, calcium stearate, magnesium steatate, sodium acetate, calcium acetate, zinc acetate, magnesium acetate, manganese acetate, lanthanum acetate, lanthanum acetylacetonate, sodium benzoate, sodium tetraphenyl borate, dibutyl tinoxide, antimony trioxide, sodium polystyrenesulfonate, PBT-ionomer, titanium isoproxide and tetraammoniumhydrogensulfate and mixtures thereof.

The range of composition of the thermoplastic resin of the present invention is from about 0 to about 70 weight percent of the polycarbonate component, and at least greater than 30 weight percent of the polyester component. In one embodiment, the composition comprises polycarbonate in the range of between about 10 weight percent and about 70 weight percent and the polyester component is present in a range of between about 31 weight percent and about 80 weight percent.

Typically the modified polycarbonate is present in amount corresponding to about 5 to about 70 weight percent based on the amount of thermoplastic resin. In another embodiment the modified polycarbonate is generally present in amount corresponding to about 10 to about 70 weight percent based on the amount of thermoplastic resin. In yet another embodiment the modified polycarbonate is present in amount corresponding to about 10 to about 65 weight percent based on the amount of thermoplastic resin.

In one embodiment the amount of impact modifier is present in a range corresponding to between about 0.5 to about 50 weight percent based on the amount of thermoplastic resin, preferably impact modifier is present in a range corresponding to between about 3 to about 20 weight percent based on the amount of thermoplastic resin.

In one embodiment of the present invention the thermoplastic resin composition may optionally comprise stabilizing additives. In another embodiment the stabilizing additives is a quenchers are used in the present invention to stop the polymerization reaction between the polymers. Quenchers are agents inhibit activity of any catalysts that may be present in the resins to prevent an accelerated interpolymerization and degradation of the thermoplastic. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. In one embodiment of the quenchers are for example of phosphorous containing compounds, boric containing acids, aliphatic or aromatic carboxylic acids i.e., organic compounds the molecule of which comprises at least one carboxy group, anhydrides, polyols, and epoxy polymer.

The choice of the quencher is essential to avoid color formation and loss of clarity of the thermoplastic composition. In one embodiment of the invention, the catalyst quenchers are phosphorus containing derivatives, examples include but are not limited to diphosphites, phosphonates, metaphosphoric acid; arylphosphinic and arylphosphonic acids; polyols; carboxylic acid derivatives and combinations thereof The amount of the quencher added to the thermoplastic composition is an amount that is effective to stabilize the thermoplastic composition. In one embodiment the amount is at least about 0.001 weight percent, preferably at least about 0.01 weight percent based on the total amounts of said thermoplastic resin compositions. The amount of quencher used is thus an amount which is effective to stabilize the composition therein but insufficient to substantially deleteriously affect substantially most of the advantageous properties of said composition.

The composition of the present invention may optionally contain additional components known as additives, which do not interfere with the previously mentioned desirable properties but enhance other favorable properties such as anti-oxidants, flame retardants, reinforcing materials, colorants, mold release agents, fillers, nucleating agents, UV light and heat stabilizers, lubricants, and the like. Additionally, additives such as antioxidants, minerals such as talc, clay, mica, barite, wollastonite and other stabilizers including but not limited to UV stabilizers, such as benzotriazole, supplemental reinforcing fillers such as flaked or milled glass, and the like, flame retardants, pigments or combinations thereof may be ad(led to the compositions of the present invention.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight based on the weight of resin. A preferred range will be from about 15 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists such as antimony oxides, are typically used at about 0.5 to 15 by weight based on the weight percent of resin in the final composition. Also, the final composition may contain polytetrafluoroethylene (PTFE) type resins or copolymers used to reduce dripping in flame retardant thermoplastics.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenyl)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl)propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl)isocyanurate, thiodiethylene glycol, N,N-bis(hydroxyethyl)oxalic acid diamide. Typical, UV absorbers and light stabilizers include i) 2-(2'-hydroxyphenyl)-benzotriazoles, for example, the 5'methyl-, 3'5'-di-tert-butyl-,5'-tert-butyl-,5'(1,1,3,3-tetramethylbutyl)-, 5-chloro-3',5'-di-tert-butyl-,5-chloro-3'tert-butyl-5'methyl-, 3'sec-butyl-5'tert-butyl-,4'-octoxy,3',5'-ditert-amyl-3',5'-bis-(alpha,alpha-dimethylbenzyl)-derivatives; ii) 2.2 2-Hydroxy-benzophenones, for example, the 4-hydroxy-4-methoxy-,4-octoxy,4-decloxy-,4-dodecyloxy-,4-benzyloxy, 4,2',4'-trihydroxy- and 2'hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate. Phosphites and phosphonites stabilizers, for example, include triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2, 4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tert-butylphenyl)4,4'-biphenylene diphosphonite.

Dyes or pigments may be used to give a background coloration. Dyes are typically organic materials that are soluble in the resin matrix while pigments may be organic complexes or even inorganic compounds or complexes which are typically insoluble in the resin matrix. These organic dyes and pigments include the following classes and examples: furnace carbon black, titanium oxide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

Typically the additive is generally present in amount corresponding to about 0 to about 1.5 weight percent based on the amount of resin. In another embodiment the additive is generally present in amount corresponding to about 0.01 to about 0.5 weight percent based on the amount of resin.

PROCESSING The method of blending the compositions can be carried out by conventional techniques. One convenient method comprises blending the polyester or polycarbonate and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. Colorants may be added to the extruder downstream of the feed port. The thermoplastic resin of this invention can be processed by various techniques including but not limited to injection molding, blow molding, extrusion into sheet, film or profiles, compression molding.

In one embodiment the blend of the present invention, polycarbonates, polyester, impact modifier and additives thereof, is polymerized by extrusion at a temperature ranging from about 225 to 350° C. for a sufficientt amount of time to produce a composition characterized by a single Tg. In the present invention, either a single or twin screw extruder can be used. The extruder should be one having multiple feeding points, allowing the catalyst quencher to be added at a location down-stream in the extruder.

In one embodiment the process is a one pass process wherein all the components were mixed together and added in the feeder. In another embodiment the process is a one pass process wherein the catalyst is added at the beginning of the extrusion process via an upstream feeding point, and the quencher is added at the later portion of the extruder process via a downstream feeding point. Since the quencher is added downstream after the completion of the reaction, it has little or no impact on the haze of the composition.

In one embodiment the catalyst is added at the beginning of the extrusion process via an upstream feeding point. The colored clear thermoplastic resin are then reloaded into the extruder and the quencher is added to tile blend in the second pass via a downstream feeding point. Since the catalyst quencher is added downstream after the completion of the reaction, it has little or no impact on the haze of the composition. The residence time can be up to about 45 to 90 minutes.

The rate at which the thermoplastic resin composition components are delivered into the extruder for melt mixing depends on the design of the screws of the extruder. Characteristic residence times for the single-pass and dotible-pass extrusion process of the invention varies according to extrusion operating parameters, the screw design.

The molten mixture of the optically clear thermoplastic resin composition so formed to particulate form, example by pelletizing or grinding the composition. The composition of the present invention can be molded into useful articles by a variety of means by many different processes to provide useful molded products such as injection, extrusion, rotation, foam molding calender molding and blow molding and thermoforming, compaction, melt spinning form articles. The thermoplastic composition of the present invention has additional properties of good mechanical properties, color stability, oxidation resistance, good flame retardancy, good processability, i.e. short molding cycle times, good flow, and good insulation properties. The articles made from the composition of the present invention may be used widely in house ware objects such as food containers and bowls, home appliances, as well as films, electrical connectors, electrical devices, computers, building and construction, outdoor equipment, trucks and automobiles.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner.

In the following examples values yellow index or YI was measured on a Spectrophotometer Color Eye 7000a from Gretag Mac-Beth according to ASTM E313. The percentage transmission and haze were determined in accordance with test method ASTM D-1003 on Haze-Gard Dual from BYK-Gardner. Melt volume rate was measured as per ISO Standard 1133, 265° C., 240 seconds, 2.16 Kg, and 0.0825 inch orifice. The Izod Impact was measured using the standard ISO 180/U method. Flex plate impact (FPI) also known as Puncture Impact was measured on Dynatup Impact using Zwick/Rel II instrument at a speed of 4.4 meters per second by ISO 6603 standard method. The B-Y span is defined as the blue to yellow span and is calculated as follows. B-Y Span=Yellowness index in Transmission–Yellowness index in reflection. The measurement of YI (Yellowness Index) in both transmission and reflection modes helps to quantify the B-Y span. For measuring YI of reflection the same instrument, using the sample, is set to the reflection mode. The Yellowness index value for reflection is generally negative.

Examples 1-5

In these example, polycarbonate available from General Electric Company as Lexan® polycarbonate resin was blended with a PCCD polyester from Eastman Chemicals and varying levels of a siloxane modified polycarbonate from General Electric Company and ABS415 as impact modifier was employed. The thermoplastic resin compositions were compounded at 270° C. on a WP25 mm co-rotating twin-screw extruder, yielding a pelletized composition. Compounding was carried out at a feed rate of about 15 kilogram per hour and a screw speed of about 300 rotations per minute. The resulting pellets were dried for at least four hours at 100° C. before injection molding into ASTM/ISO test specimens on an 80 ton, four oz. injection molding machine operated at a temperature of about 280° C. The siloxane modified polycarbonate used here had a siloxane content of 6% and the ABS415 a rubber (butadiene) content of 50%. The ingredient amounts were chosen to maintain similar soft phase (siloxane+rubber) content among the examples. Samples molded from the composition were tested for heat properties (HDT and Vicat), impact properties at different temperatures (izod Notched Impact and Flex Plate Impact), flow behavior (MVR) and optical properties like % Transmission, % haze and yellow index. The compositions, the total level of soft phase (siloxane+butadiene rubber) and the various properties are indicated in Tables 1 and 2

TABLE 1

| Composition: | CEx. 1 | CEx. 2 | CEx. 3 | CEx. 4 | CEx. 5 | CEx. 6 |
|---|---|---|---|---|---|---|
| Polycarbonate | 41.7 | 16.7 | 46.1 | 20 | — | — |
| PCCD | — | — | 46.1 | 21.7 | 41.7 | 16.7 |
| Siloxane modified polycarbonate | 58 | 83 | — | 58 | 58 | 83 |
| ABS 415 | — | — | 7 | — | — | — |
| Properties: | | | | | | |
| MVR @ 265° C., 2.16 Kg-4 min [cm3/10 min] | 8.5 | 6.2 | 14.3 | 10.8 | 12.9 | 7.6 |
| Izod Notched Impact @ 23° C. [kJ/m2] | 59.0 | 56.2 | 63.0 | 63.3 | 67.1 | 58.8 |
| Izod Notched Impact @ 0° C. [kJ/m2] | 50.8 | 50.1 | 56.2 | 44.8 | 13.0 | 49.0 |
| Izod Notched Impact @ −10° C. [kJ/m2] | 46.2 | 46.7 | 50.9 | 16.8 | 12.6 | 41.1 |
| Izod Notched Impact @ −20° C. [kJ/m2] | 31.2 | 41.5 | 19.4 | 14.3 | 10.7 | 17.6 |
| Izod Notched Impact @ −25° C. [kJ/m2] | 22.4 | 38.7 | 17.4 | 13.5 | 10.0 | 17.0 |
| Puncture Impact (4.4 m/s) @ 23° C. [J] | 124.9 | 122.2 | 121.0 | 123.5 | 122.1 | 120.5 |
| Puncture Impact (4.4 m/s) @ −30° C. [J] | 92.4 | 93.2 | 60.5 | 100.1 | 99.1 | 97.5 |
| Transmission @ 2.5 mm [%] | 86.0 | 86.1 | 88.4 | 89.2 | 90.8 | 88.8 |
| Haze | 2.2 | 2.3 | 4.2 | 1.1 | 1.0 | 1.3 |
| YI in Transmission @ 2.5 mm | 7.4 | 7.9 | 4.6 | 4.3 | 2.5 | 4.9 |
| YI in Reflection @ 2.5 mm | −7 | −8.1 | 0.5 | −2.7 | −1.5 | −3.2 |
| B-Y span | 14.4 | 16 | 4.1 | 7 | 4 | 8.1 |

ABS = Acrylonitrile-butadiene-styrene

TABLE 2

| Composition: | Ex. 1 | Ex. 2 | Ex. 3 | Ex. 4 | Ex. 5 |
|---|---|---|---|---|---|
| Polycarbonate | 21.1 | 6.1 | 31.1 | 18.1 | 10.7 |
| PCCD | 46.6 | 46.6 | 46.6 | 46.6 | 42.0 |
| Siloxane modified polycarbonate | 25 | 42 | 17 | 30 | 42 |
| ABS 415 | 7 | 5 | 5 | 5 | 5 |
| Properties: | | | | | |
| MVR @ 265° C., 2.16 Kg-4 min [cm3/10 min] | 11.8 | 12.1 | 15.2 | 13.8 | 11.7 |
| Izod Notched Impact @ 23° C. [kJ/m2] | 71.7 | 78.6 | 79.3 | 80.9 | 71.1 |
| Izod Notched Impact @ 0° C. [kJ/m2] | 62.9 | 67.5 | 67.9 | 70.1 | 61.9 |
| Izod Notched Impact @ −10° C. [kJ/m2] | 58.8 | 61.4 | 62.9 | 62.2 | 58.5 |
| Izod Notched Impact @ −20° C. [kJ/m2] | 49.4 | 46.6 | 19.1 | 46.7 | 50.0 |
| Izod Notched Impact @ −25° C. [kJ/m2] | 33.4 | 23.8 | 19.3 | 19.3 | 39.4 |
| Puncture Impact (4.4 m/s) @ 23° C. [J] | 118.4 | 113.3 | 119.9 | 127.1 | 113.8 |
| Puncture Impact (4.4 m/s) @ −30° C. [J] | 103.7 | 113.0 | 118.1 | 116.3 | 115.0 |
| Transmission @ 2.5 mm [%] | 90.0 | 90.1 | 89.8 | 90.4 | 89.6 |
| Haze | 1.8 | 1.8 | 2.3 | 1.7 | 2.4 |
| YI in Transmission @ 2.5 mm | 4.4 | 4.0 | 4.0 | 3.9 | 4.4 |
| YI in Reflection @ 2.5 mm | 0.4 | 0.1 | −0.1 | 0.1 | −0.3 |
| B-Y span | 4 | 3.9 | 4.1 | 3.8 | 4.7 |

ABS = Acrylonitrile-butadiene-styrene

Table 1 shows comparative examples, which fall outside the scope of the invention. The comparative examples do not show a good combination flow, optical and impact properties. As the amount of either siloxane modified polycarbonate or impact modifier increases the impact performance increases however a decrease in flow, heat and optical performance is observed. In examples CEx. 4 to CEx. 6 the flow and optical property with respect to B-Y span is improved with decrease in heat based on amount of polyester. The impact performance is drastically decreased; indicating that a siloxane modified polycarbonate looses its impact behavior in a blend with PCCD.

The loss of impact performance of the siloxane modified polycarbonate is not observed in a blend of siloxane modified polycarbonate with polycarbonate, polyester and impact modifier. In addition the flow, impact and optical properties of these blends are all significantly improved. The results given clearly show that blends of siloxane modified polycarbonate and/or polycarbonate with polyester along with the impact modifier gives thermoplastic compositions with Food optical, flow and impact performance and heat resistance. The Blue-Yellow span also decreases significantly. Additionally low temperature impact properties also show improvement. Improved optical and impact properties are observed at lower impact modifier levels, higher siloxane modified polycarbonate levels and polyester levels.

The thermoplastic compositions of the invention with modified polycarbonate have beneficial properties and a balance of optical properties, good flow, and in addition possess good impact properties.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art Using no more than routine experimentation, and all such modifications and equivalents are believed to be within the spirit and scope of the invention as defined by the following claims. All Patents and published articles cited herein are incorporated herein by reference.

The invention claimed is:

1. A composition consisting essentially of an optically clear thermoplastic resin composition consisting essentially of:
   (a) at least one substituted or unsubstituted polycarbonate,
   (b) a polyorganosiloxane/polycarbonate block copolymer of the structure XVI:

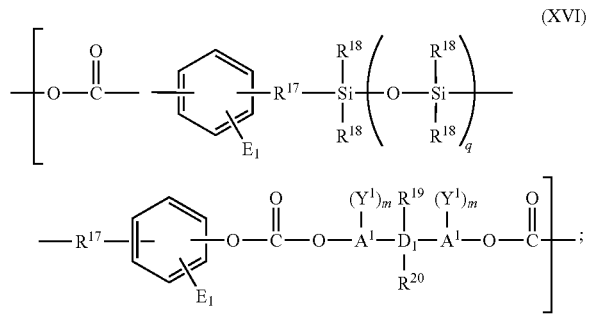

wherein $R^{17}$, $R^{18}$ and $R^{20}$ are independently at any occurrence an aliphatic, aromatic or cycloaliphatic radical; $E_1$ is a member independently selected from the group consisting of hydrogen, lower alkyl, alkoxy, aryl, alkylaryl, halogen radicals and mixtures thereof; $A^1$ is a hydrocarbon radical; $D_1$ is a tetravalent hydrocarbon radical $Y^1$ is a member at each occurrence independently selected from the group consisting of fluorine, bromine, chlorine, iodine, nitro, alkenyl, allyl, alkyl, aryl, aralkyl, alkaryl, cycloalkyl, or $OR^2$ wherein $R^2$ is alkyl, aryl, aralkyl, alkaryl, or cycloalkyl; m is zero to the number of replaceable hydrogens on $A^1$ available for substitution; and q is an integer between 1 and 200,
   having polyorganosiloxane domains having an average domain size less than or equal to 45 nanometers;
   (c) at least greater than 30 weight percent of a (semi) aliphatic polyester selected from the group consisting of poly(cyclohexane dimethanol cyclohexane dicarboxylate), cyclohexanedimethanol-terephthalic acid-ethylene glycol copolymers and combinations thereof;
   (d) an impact modifier having a refractive index in the range between about 1.51 and about 1.56; and
   (e) an additive;
   wherein the composition has a Notched Izod Impact of at least 55 kJ per m² at 0° C. as measured using ISO 180/U method, a Puncture Impact of at least 100 J at −30° C. as measured using ISO 6603 Standard Method, a Melt Volume Rate of at least 11 cm³/10 min as measured using ISO Standard 133 Method, a yellowness index of less than about 6 measured in accordance with ASTM D-1003, and a haze value about less than 3 measured in accordance with ASIM D-1003.

2. The composition of claim 1, wherein the thermoplastic resin composition comprises about 30 to 95 percent by weight of the (semi)aliphatic polyester and about 10 to about 70 percent by weight of the substituted or unsubstituted polycarbonate.

3. The composition of claim 1, wherein the polyorganosiloxane/polycarbonate block copolymer is present in the range of between about 5 and 70 weight percent based on the total weight of the thermoplastic composition.

4. The composition of claim 1, wherein the impact modifier is selected from the group consisting of graft or core shell acrylic rubbers, diene rubber, organosiloxane rubber, ethylene propylene diene monomer rubber, styrene-butadiene-styrene rubber, styrene-ethylene-butadiene-styrene rubber, acrylonitrile-butadiene-styrene rubber, methacrylate-butadiene-styrene rubber, and styrene acrylonitrile copolymer.

5. The composition of claim 1, wherein the impact modifier is at least one selected from the group consisting of MBS core shell polymer and ABS rubber.

6. The composition of claim 1, wherein the impact modifier is present in an amount between about 0.5 and about 50 weight percent based on the total weight of the thermoplastic composition.

7. The composition of claim 1, wherein the additive is at least one selected from a group consisting of anti-oxidants, flame retardants, reinforcing materials, colorants, mold release agents, fillers, nucleating agents, UV light stabilizers, heat stabilizers, lubricants, and combinations thereof.

8. The composition of claim 1, wherein the additive is present in the range of between about 0.1 and 1.5 weight percent based on the total weight of the thermoplastic resin.

9. The composition of claim 1, wherein the composition has a Notched Izod Impact of at least greater than 65 kJ per m² at 23° C. as measured using ISO 180/U method.

10. The composition of claim 1, wherein the composition has a Notched Izod Impact of at least greater than 55 kJ per m² at 0° C. as measured using ISO 180/U method.

11. The composition of claim 1, wherein the composition has a Puncture Impact of at least greater than 100 J at −30° C. as measured using ISO 6603 Standard Method.

12. The composition of claim 1, wherein the optically clear resin composition has a Melt Volume Rate of at least greater than 11 cm³/10 min as measured using ISO Standard 1133 Method.

13. The composition of claim 1, wherein the thermoplastic resin composition has a yellowness index of less than about 6 measured in accordance with ASTM E313.

14. The composition of claim 1, wherein the optically clear resin composition has a haze value about less than 3 measured in accordance with ASTM D-1003.

15. The composition of claim 1, wherein the optically clear resin composition transmits about greater than 85 percent light in the region of about 250 nm to about 300 nm measured in accordance with ASTM D-1003.

16. An article comprising the composition of claim 1.

17. The composition of claim 1, wherein the additive is at least one selected from a group consisting of anti-oxidants, flame retardants, reinforcing materials, colorants, mold release agents, fillers, nucleating agents, UV light stabilizers, heat stabilizers, lubricants, and combinations thereof.

18. The composition as claimed in claim 1, wherein the substituted or unsubstituted polycarbonate is present in an amount of between 6.1 and 31.1 weight percent based on the total weight of the composition, and wherein the composition has an Izod Notched impact at −25° C. of at least 33.4 kJ/m² as measured using the ISO 180/U method.

19. The composition as claimed in claim 1, wherein the impact modifier is selected from the group consisting of styrene-butadiene-styrene rubber, styrene-ethylene-butadiene-styrene rubber, acrylonitrile-butadiene-styrene rubber, methacrylate-butadiene-styrene rubber, and combinations thereof.

20. The composition as claimed in claim 19, wherein the composition does not contain impact modifiers selected from the group consisting of organosiloxane rubber, ethylene propylene diene monomer rubber, and styrene acrylonitrile copolymers.

21. The composition of claim 1, wherein the polyorganosiloxane/polycarbonate block copolymer comprises about 1.0 to about 2.5 percent by weight siloxane content.

22. A composition comprising an optically clear blend of:
(a) a polyorganosiloxane/polycarbonate block copolymer of the structure XVII:

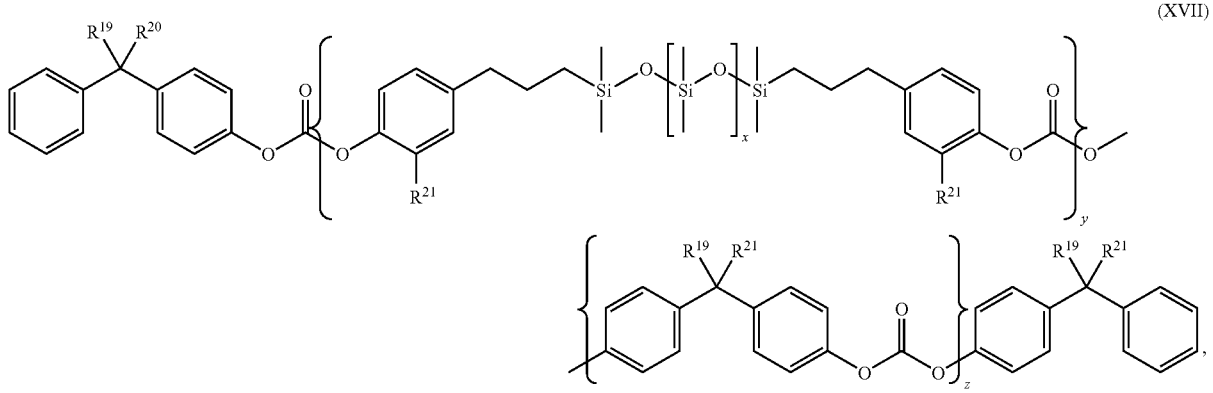

wherein $R^{19}$ and $R^{20}$ are the same or different, and are aryl, halogenated aryl, aralkyl, alkyl, cycloalkyl, or haloalkyl radicals; $R^{19}$ and $R^{20}$ can be all the same radical or any two or more of the aforementioned radicals, $R^{21}$ is an alkyl, aryl, alkoxy, or aryloxy radical; and y and z are integers between about 1 to 1000, x is an integer between 0 and 199; and
having polyorganosiloxane domains having an average domain size less than or equal to 45 nanometers;
(b) at least greater than 30 weight percent of a (semi) aliphatic polyester selected from the group consisting of poly(cyclohexane dimethanol cyclohexane dicarboxylate), cyclohexanedimethanol-terephthalic acid-ethylene glycol copolymers, polyethylene glycol cyclohexane dimethanol terephthalate, and combinations thereof;
(c) an impact modifier having a refractive index in the range between about 1.51 and about 1.56; and
(d) an additive; and
(e) a substituted or unsubstituted polycarbonate;
wherein the composition has a Notched Izod Impact of at least 55 kJ/m$^2$ at 0° C. as measured using ISO 180/U method, a Puncture Impact of at least 100 J at −30° C. as measured using ISO 6603 Standard Method, a Melt Volume Rate of at least 11 cm$^3$/10 min as measured using ISO Standard 1133 Method, a yellowness index of less than about 6 measured in accordance with ASTM D-1003, and a haze value about less than 3 measured in accordance with ASIM D-1003.

23. The composition as claimed in claim 22, wherein the substituted or unsubstituted polycarbonate is present in an amount of between 6.1 and 31.1 weight percent based on the total weight of the composition, and wherein the composition has an Izod Notched impact at −25° C. of at least 33.4 kJ/m$^2$ as measured using the ISO 180/U method.

24. The composition as claimed in claim 22, wherein the impact modifier is selected from the group consisting of styrene-butadiene-styrene rubber, styrene-ethylene-butadiene-styrene rubber, acrylonitrile-butadiene-styrene rubber, methacrylate-butadiene-styrene rubber, and combinations thereof.

25. The composition of claim 24, wherein the composition does not contain impact modifiers selected from the group consisting of organosiloxane rubber, ethylene propylene diene monomer rubber, and styrene acrylonitrile copolymers.

26. A composition comprising an optically clear blend of:
(a) from about 10 to about 70 weight percent of a polyorganosiloxane/polycarbonate block copolymer of the structure XVIII:

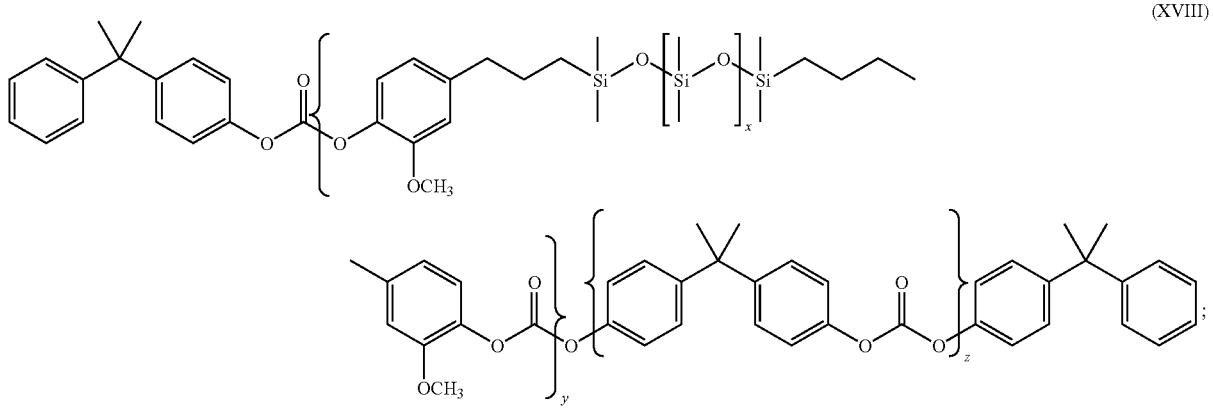

wherein x is an integer between 0 and 199; and y and z are integers between 1 and 1000;
  (b) a substituted or unsubstituted bisphenol A polycarbonate;
  (c) from about 31 to about 80 weight percent of a (semi) aliphatic polyester selected from the group consisting of poly(cyclohexane dimethanol cyclohexane dicarboxylate), cyclohexanedimethanol-terephthalic acid-ethylene glycol copolymers, and combinations thereof; and
  (d) from about 0.5 to about 50 weight percent of an impact modifier having a refractive index in the range between about 1.51 and about 1.56;
wherein the composition has a Notched Izod Impact of at least 55 kJ per m² at 0° C. as measured using ISO 180/U method, a Puncture Impact of at least 100 J at −30° C. as measured using ISO 6603 Standard Method, a Melt Volume Rate of at least 11 cm³/10 min as measured using ISO Standard 1133 Method, a yellowness index of less than about 6 measured in accordance with ASTM D-1003, and a haze value about less than 3 measured in accordance with ASTM D-1003.

27. The composition as claimed in claim 26, wherein the substituted or unsubstituted polycarbonate is present in an amount between 6.1 and 31.1 weight percent based on the total weight of the composition, and wherein the composition has an Izod Notched impact at −25° C. of at least 33.4 kJ/m² as measured using the ISO 180/U method.

28. The composition as claimed in claim 26, wherein the impact modifier is selected from the group consisting of styrene-butadiene-styrene rubber, styrene-ethylene-butadiene-styrene rubber, acrylonitrile-butadiene-styrene rubber, methacrylate-butadiene-styrene rubber, and combinations thereof.

29. The composition of claim 28, wherein the composition does not contain impact modifiers selected from the group consisting of organosiloxane rubber, ethylene propylene diene monomer rubber, and styrene acrylonitrile copolymers.

* * * * *